United States Patent [19]

Higgins et al.

[11] Patent Number: 4,928,391
[45] Date of Patent: May 29, 1990

[54] CARPET TILE CUTTING MACHINE

[75] Inventors: Kenneth B. Higgins, LaGrange, Ga.; Walter Engels, Tryon, N.C.

[73] Assignee: Milliken Research Corporation, Spartanburg, S.C.

[21] Appl. No.: 331,165

[22] Filed: Mar. 31, 1989

[51] Int. Cl.⁵ .............................................. B26B 29/00
[52] U.S. Cl. ....................................... 30/293; 83/745; 83/574; 33/DIG. 20
[58] Field of Search ................ 83/455, 614, 468, 743, 83/744, 745, 574; 30/293, 289; 33/DIG. 20, 526, 527

[56] References Cited

U.S. PATENT DOCUMENTS 2,619,173 11/1952 Crain ....................................... 83/468
3,807,269 4/1974 Mertes ..................................... 83/468

Primary Examiner—Douglas D. Watts
Assistant Examiner—Hwei-Siu Payer
Attorney, Agent, or Firm—Earle R. Marden; H. William Petry

[57] ABSTRACT

Apparatus and method to properly cut to size the carpet tiles which are used to complete the carpeted areas adjacent walls, doors, etc. in an area to be carpeted. The apparatus encompasses a machine which is placed against a carpet tile already in position and has spring loaded arms which extend therefrom to a point abutting the wall or door structure to fix the position of a cutter on the apparatus so that it cuts the actual size necessary to fill the gap between the previously laid tile and the wall or door sensed by the spring loaded arms.

14 Claims, 4 Drawing Sheets

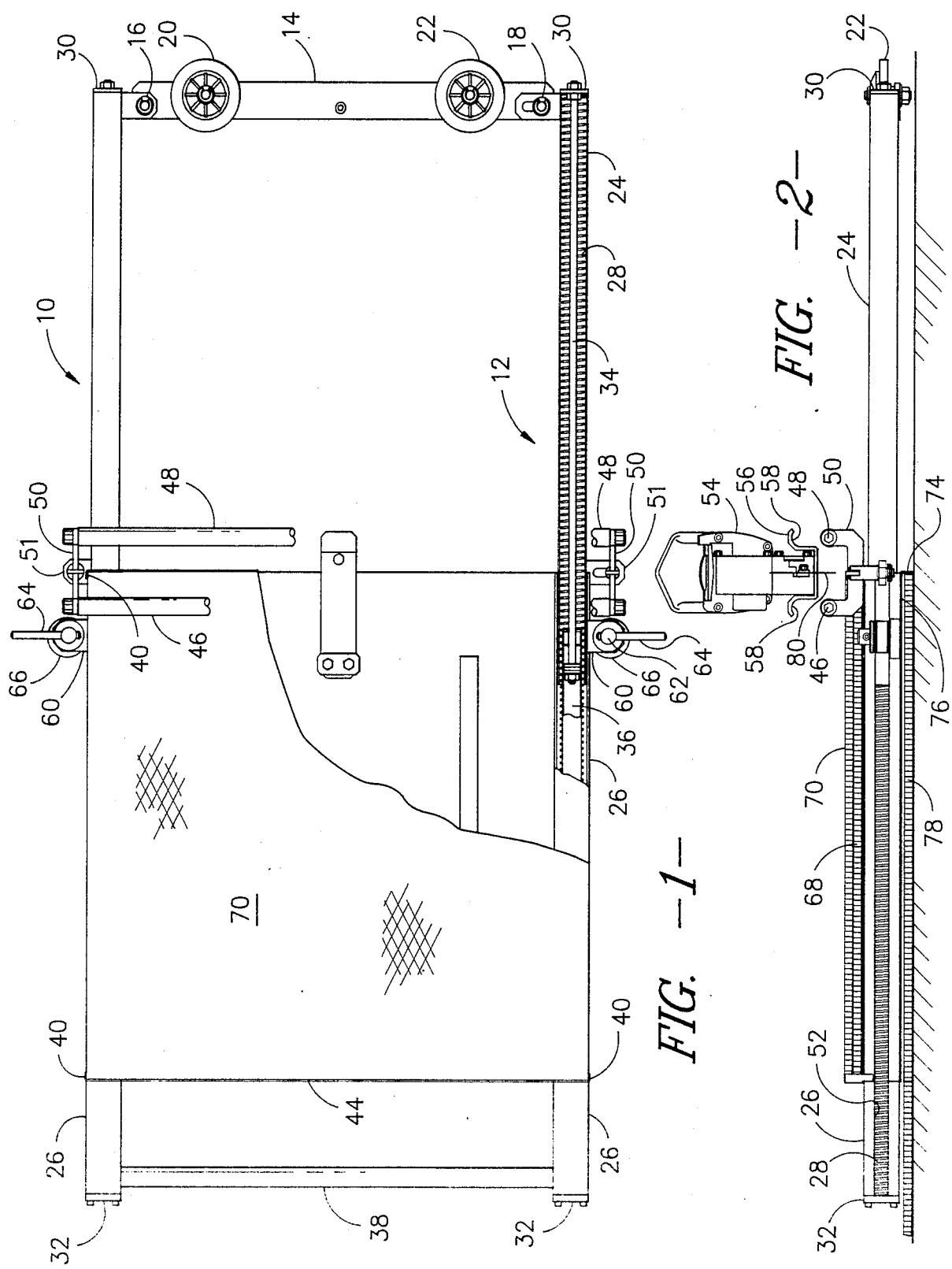

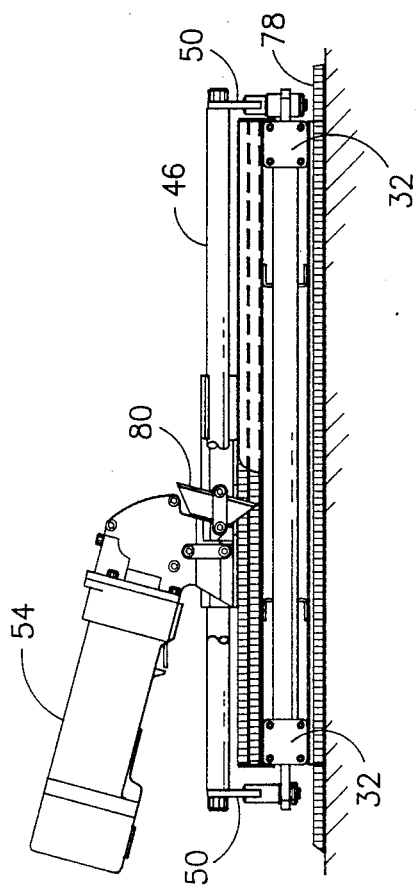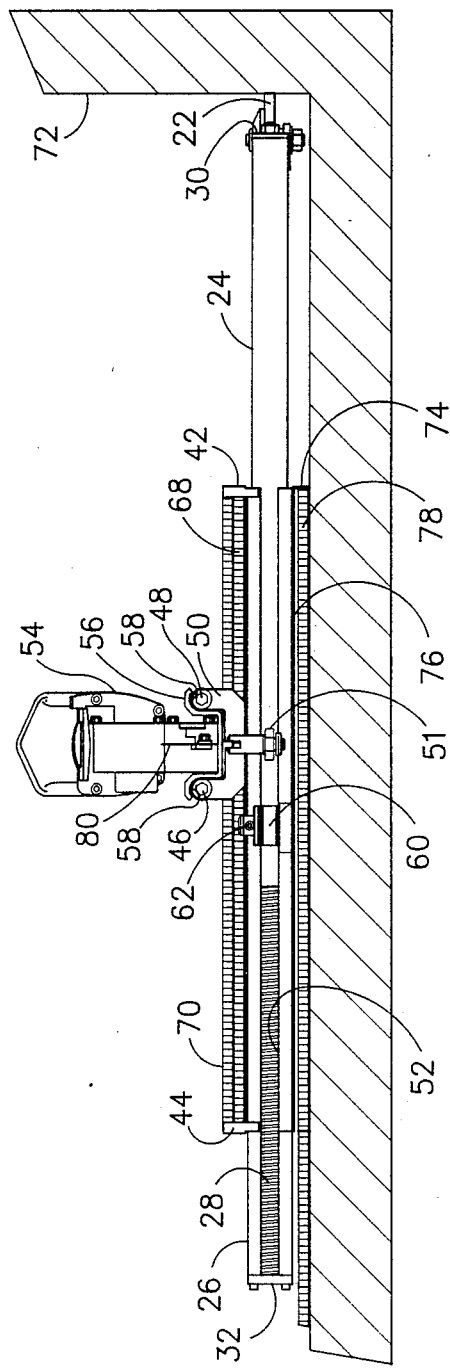

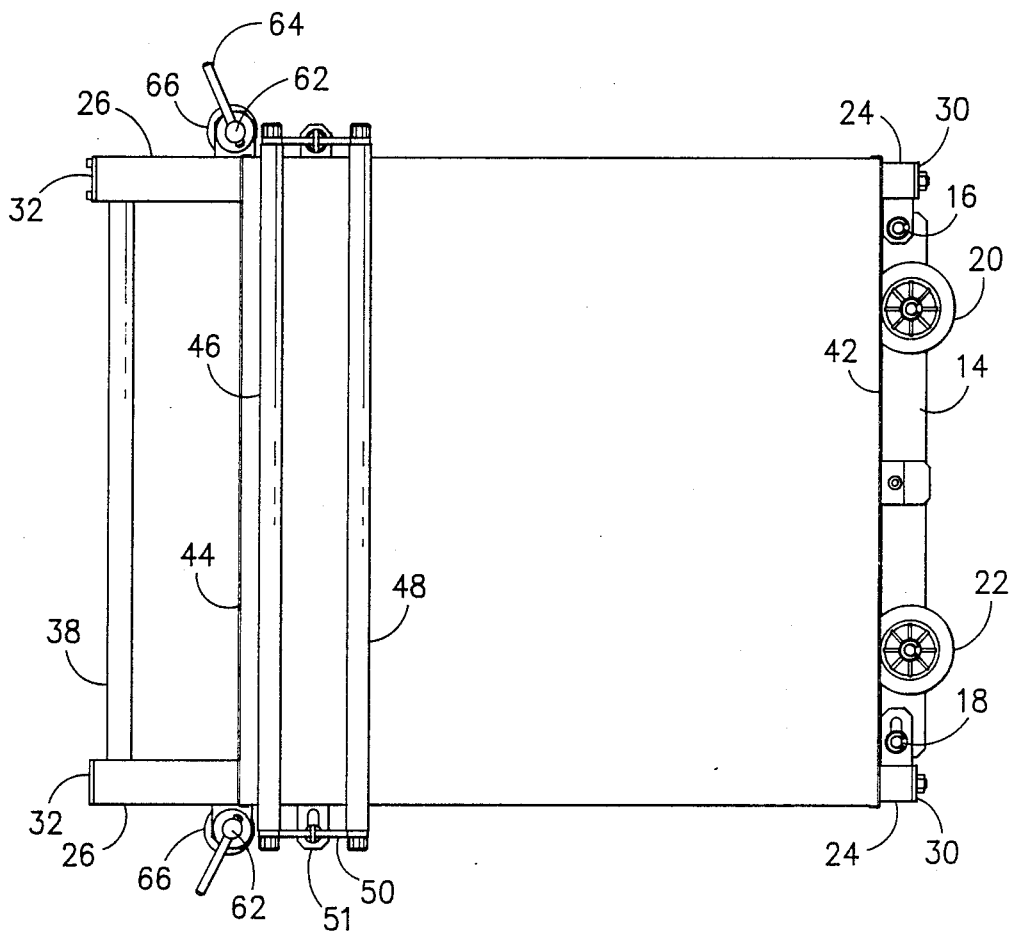
FIG. —5—

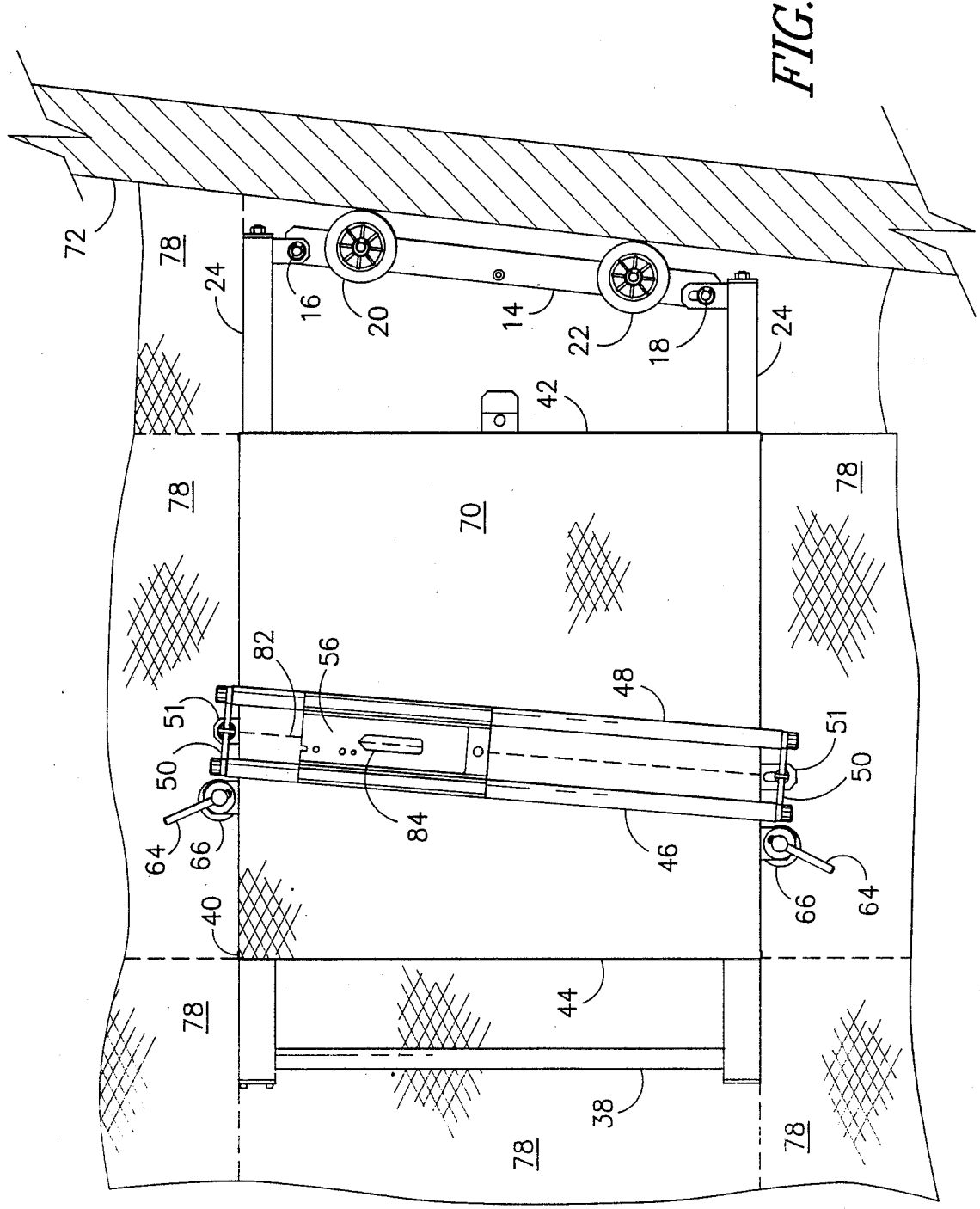
FIG. —6—

CARPET TILE CUTTING MACHINE

This invention relates to a machine to accurately cut carpet tiles which are placed adjacent the exterior surfaces, such as walls, of an area being carpeted and the area to be covered by the tile is smaller than the standard carpet tile.

Therefore, an object of the invention is to provide a method and a machine to accurately cut carpet tiles for areas smaller than the standard carpet tile.

Other objects and advantages of the invention will become clearly apparent as the specification proceeds to describe the invention with reference to the accompanying drawings in which:

FIG. 1 is a top view, with parts broken away, of the new and improved carpet title cutter, with the cutter per se removed;

FIG. 2 is a side view of the cutter shown in FIG. 1;

FIG. 3 is a left hand elevation view of the cutter shown in FIG. 1;

FIG. 4 is a view similar to FIG. 2 with the cutter in position adjacent a wall to which carpet is to be abutted;

FIG. 5 is a top view of the cutter in a retracted position and locked; and

FIG. 6 is an exaggerated view of the cutter in position against a wall member which is out-of-line.

When laying carpet tiles of certain selected sizes such as 18" square, the tiles are normally laid initially in the center of the area to be carpeted and built outwardly therefrom towards the walls and doors surrounding the carpeted area. When the carpet tiles have reached a point where the remaining areas to be carpeted are less than the standard carpet tile size, e.g. 18", then each carpet tile must be cut to conform to the remaining area. Before this invention, it was necessary to measure each remaining area and then lay out the measured distance on the tile and then cut the carpet tile or to lay oversized carpet into the remaining space with the excess up the wall and hand scribe or cut. To eliminate this long and tedious procedure the carpet cutting machine described herein was designed for this use.

Looking now to FIGS. 1-3, the basic carpet cutting tile apparatus will be explained. The apparatus is designed to have two telescoping arms 10 and 12 to which at one end a crossbar 14 is pivotally mounted at both ends at 16 and 18, respectively. Rotatable mounted to the crossbar 14 are a pair of wheels 20 and 22 for reasons hereinafter explained.

The telescoping arms 10 and 12 consist of a tubing 24, preferably rectangular, which slides in the tubing 26, preferably rectangular, as determined by the position of the compression spring 28. The compression spring 28 abuts the plate 30 at one end of the tube 26 and the plate 32 at the other end. A cylinder rod 34 mounted at one end to the plate 30 is located within the confines of the spring 28 and has the other end guided by the cylinder 36 in which it slides to provide smooth movement of the tubing 24. The arms 10 and 12 are spaced from one another with a rod member 38 welded or otherwise secured therebetween. Spaced from the rod member 38 are a pair of additional rod member 44 and 42 spaced from one another a distance that conforms to the size of a standard carpet tile (e.g. 18"). The rod members 42 and 44 are mounted on top of the cylinder 36 and have flanges 40 on the outer ends thereof to confine a carpet tile placed therein.

Centrally located of the apparatus are a pair of tubular bar members 46 and 48 extending between a pair of upstanding U-shaped members 50 connected to the sides of the inner tube 24 by means of a tab 51 which slides therewith in the slot 52 in the outer tube 26. As shown in FIGS. 2 and 3 a commercially available cutter 54 with a lipped U-shaped bracket 58 is slidably mounted on the rods 46 and 48 with the lips 58 thereof engaging the rod members.

Extending through the slots 52 on both sides of the cutting apparatus is a perforated tab 60 which is welded or otherwise secured to the outside wall of the cylinder 26 and moves therewith. Located in the perforation, not shown, in the tab 60 is a bolt 62 which has a handle 64 in the top thereof and an eccentric cam 66 on the bottom thereof which, when rotated, engages the wall of the cylinder 24 to prevent movement of the sliding cylinder 26.

OPERATION AND USE

When carpet tiles have been laid centrally of the area to be carpeted and it is necessary to lay narrower tiles around the perimeter thereof adjacent a wall the disclosed apparatus is used. Before use one carpet tile or similar backup material 68 is placed in the apparatus between the rod members 42 and 44. Then a carpet tile member 70 to be cut is placed thereover between the rod members 42 and 44 under the U-shaped member 56 supporting the cutter 54 on the bar members 46 and 48. Then, looking at FIG. 4 in particular, the cutting apparatus is placed against the wall 72 with the wheels 20 and 22 thereagainst. Then the apparatus is moved towards the wall 72 causing the tube 24 to slide into the tube 26 against the action of the spring until the lip 74 of the plate 76 drops over and against the outside edge of the perimeter tile 78 already placed into position. Since the bars 46 and 48 are connected to the tab 51 which slides in the groove 52 of the cylinder 26 the cutter 54 is slid the same distance as the cylinder 24 so that the distance between the centerline of the cutter blade 80 and the position of the carpet tile 70 away from the wall 72 is equal to the distance between the wall and outer perimeter of the carpet tile in place abutted by the lip 74. Then the cutter 54 is moved across the carpet tile 70 so that the blade 80 severs same to provide a carpet tile portion which will fit the exposed area between the wall 72 and carpet tile already in situ. If it is desired to cut further carpet tiles to the same dimension the handle 64 can be rotated to move the eccentric cam into engagement with the wall of the tube 24 to lock it in position so that a new carpet tile 70 placed under the cutter 54 will be cut to the same size.

Also, if desired, a scale can be mounted on the side of the cutting apparatus so that a plurality of the same size tiles can be cut at a remote position by positioning the tube 24 in the desired position indicated on the scale, rotating the handle 64 to lock the tube 24 in position and proceed to cut a series of carpet tiles placed under the cutter 54. One such typical position could be shown like that indicated in FIG. 5.

As discussed briefly before, the crossbar 14 is pivotally mounted at 16 and 18. Also the U-shaped rod support members 50 are rotatably H.S.P. mounted to the tab members 51. As shown in FIG. 6, many times the wall 72 is not parallel to the perimeter edge of the installed carpet tile 78 so that the carpet tile necessary to fill the vacant area between the tile 78 and the wall has to be cut at an angle. As shown in FIG. 6 the pivot points 16 and 18, as well as the rotatable H.S.P. U-shaped members 50 allow the bar members 46 and 48 to assume the correct position to cut the tile member 70 on the line 82 which is parallel to the surface of the wall 72. In FIG. 6 the cutter 54 is removed for clarity but the cutter blade 80 of the cutter projects through the elongated opening 84 in the plate 56 to cut the carpet tile 70 on the line 82. As in FIGS. 1–5, if desired, the handle 64 can be rotated to rotate the eccentric cam 66 against the tube 24 to lock it in place if your desire to cut more than one carpet tile the exact same size.

It can be seen that the described apparatus provides a means to cut a carpet tile so that it exactly fits into the desired area without manually having to measure and manually cut the tile. Furthermore, the described apparatus provides a means to cut a number of tiles the exact same size without numerous manual operations which cannot guarantee that each carpet tile member will be the same size. Also, the wheels allow the cutting apparatus to be slid to the next adjacent position by rolling the wheels against the wall as the apparatus is moved to the next position.

Although the preferred embodiments of the invention have been described fully in detail it is understood that changes may be made without departing from the scope of the invention and it is desired that the invention only be limited by the scope of the claims.

We claim:

1. Apparatus to cut carpet tiles accurately for placement in an area smaller than a standard carpet tile comprising: a pair of tubular members spaced from one another, a first means interconnecting said tubular members at one end, a second means pivotally connected to each of tubular members at the other end, each of tubular members having a first fixed tube and a second tube slidably mounted in said first fixed tube, biasing means in each of said tubular members biasing said second tube outwardly from said first fixed tube, a wall abutment means mounted on said second means and a cutter means operably associated with each of said second tubes substantially parallel to said second means to cut carpet tiles thereunder when said second tube is slid in said fixed tube when said wall abutment means is forced against a wall member.

2. The apparatus of claim 1 wherein said cutter means is connected to said second tubes.

3. The apparatus of claim 2 wherein said fixed tube has a flanged member connected thereto with the flange depending downward and adapted to engage a carpet tile edge.

4. The application of claim 3 wherein said biasing means is a compression spring.

5. The apparatus of claim 4 wherein a means is provided to lock the relative position of the sliding tube to the fixed tube.

6. The apparatus of claim 5 wherein said locking means includes at least one perforated tab member connected to the side of second tube and rotatably bolt member in the perforated tab member with an eccentric cam in the bottom thereof which engages the fixed tube when said bolt member is rotated.

7. The apparatus of claim 6 wherein said wall abutment means includes wheels.

8. Apparatus to accurately cut carpet tiles from standard size carpet tiles comprising: a pair of two piece tubular members spaced from one another, each tubular having a fixed tube and second tube slidably mounted in the fixed tube with springs means therein biasing the second tube outwardly, means connecting the ends of said fixed tubes and holding them in spaced relationship, a second connecting means pivotally connected to the ends of said second tube away from said fixed tube, cutter support means rotatably mounted to each of second tubes and having cutter support bars mounted to said cutter support means, wall abutment means mounted on said second connecting means, carpet tile support means under said cutter support bars and a cutter means slidably mounted on said cutter support bars to cut the carpet tile placed thereunder when said abutment means having engaged a wall member and said second tube has been slid towards said fixed tube against the bias of said spring means.

9. The apparatus of claim 8 wherein said fixed tube has a flanged member connected thereto with the flange depending downward and adapted to engage a carpet tile edge.

10. The apparatus of claim 9 wherein a means is provided to lock the relative position of the sliding tube to the fixed tube.

11. The apparatus of claim 10 wherein said locking means includes at least one perforated tab member connected to the side of second tube and rotatably bolt member in the perforated tab member with an eccentric cam in the bottom thereof which engages the fixed tube when said bolt member is rotated.

12. The apparatus of claim 11 wherein said wall abutment means includes wheels.

13. Apparatus to cut carpet tiles accurately for placement in an area smaller than a standard carpet tile comprising: a pair of tubular members spaced from one another, a first means interconnecting said tubular members at one end, a second means connected to each to tubular members at the other end, biasing means in each of said tubular members biasing said second means outwardly from said first means, a wall abutment means mounted on said second means, a third means located between said tubular members to support a carpet tile and a fourth means located above said third means to accommodate a cutter means to cut a carpet tile on said third means when said second means is slid by said tubular members when said wall abutment means is forced against a wall member.

14. The apparatus of claim 13 wherein said wall abutment means includes wheels.

* * * * *